United States Patent
Carr et al.

(10) Patent No.: US 8,428,773 B1
(45) Date of Patent: Apr. 23, 2013

(54) SYSTEMS AND METHODS OF ASSOCIATING INDIVIDUAL PACKAGES WITH HARVEST CRATES

(75) Inventors: J. Scott Carr, Redwood City, CA (US); Elliott Grant, Redwood City, CA (US); Kevin Ma, San Jose, CA (US); Jeff Roughgarden, Redwood City, CA (US); Lin Zhang, Mountain View, CA (US); Matthew Self, Emerald Hills, CA (US)

(73) Assignee: YottaMark, Inc., Redwood City, CA (US)

( * ) Notice: Subject to any disclaimer, the term of this patent is extended or adjusted under 35 U.S.C. 154(b) by 828 days.

(21) Appl. No.: 12/370,346

(22) Filed: Feb. 12, 2009

Related U.S. Application Data

(60) Provisional application No. 61/028,163, filed on Feb. 12, 2008.

(51) Int. Cl.
*G06K 7/10* (2006.01)

(52) U.S. Cl.
USPC .............................. 700/230; 702/19; 426/392

(58) Field of Classification Search .................. 700/213, 700/219–221, 225, 226, 228, 230; 209/509–707
See application file for complete search history.

(56) References Cited

U.S. PATENT DOCUMENTS

| | | |
|---|---|---|
| 3,329,181 A | 7/1967 | Buss |
| 4,385,482 A * | 5/1983 | Booth .............................. 53/538 |
| 4,526,404 A | 7/1985 | Vazquez |
| 4,544,590 A | 10/1985 | Egan |
| 4,832,204 A | 5/1989 | Handy et al. |
| 4,846,504 A | 7/1989 | MacGregor et al. |
| 5,136,826 A | 8/1992 | Carson et al. |
| 5,271,642 A | 12/1993 | Jahier et al. |
| 5,343,529 A | 8/1994 | Goldfine et al. |
| 5,360,628 A | 11/1994 | Butland |
| 5,361,904 A | 11/1994 | Kapec et al. |

(Continued)

FOREIGN PATENT DOCUMENTS

| CN | 1350265 A | 5/2002 |
|---|---|---|
| JP | 2000011114 A2 | 1/2000 |

(Continued)

OTHER PUBLICATIONS

PCT/US08/75626 International Search Report and Written Opinion, Nov. 26, 2008.

(Continued)

*Primary Examiner* — Gene Crawford
*Assistant Examiner* — Kyle Logan
(74) *Attorney, Agent, or Firm* — Peters Verny, LLP

(57) ABSTRACT

Clamshells for packaging produce, or other unit packaging, are labeled with unique codes. Harvest crates for transporting filled clamshells from the harvest, or other containers for transporting unit packaging, are also labeled with unique codes. A plurality of labeled un-filled clamshells are nested together and placed into each harvest crate before the harvest, and the codes from the clamshells and the harvest crate are stored in association. In some instances, clamshells are de-nested, labeled with pre-printed labels, and nested again before being placed into the harvest crates. At the harvest the clamshells are removed from the harvest crate, de-nested, filled with produce, packed back into the harvest crate, and moved into the distribution chain. The unique codes are further associated with other information such as harvest data.

14 Claims, 4 Drawing Sheets

U.S. PATENT DOCUMENTS

| | | | | |
|---|---|---|---|---|
| 5,362,949 A * | 11/1994 | Gulick | | 235/385 |
| 5,478,990 A | 12/1995 | Montanari et al. | | |
| 5,486,686 A | 1/1996 | Zydbel, Jr. et al. | | |
| 5,561,970 A * | 10/1996 | Edie et al. | | 53/473 |
| 5,569,317 A | 10/1996 | Sarada et al. | | |
| 5,592,561 A | 1/1997 | Moore | | |
| 5,611,948 A | 3/1997 | Hawkins | | |
| 5,619,416 A | 4/1997 | Kosarew | | |
| 5,668,803 A | 9/1997 | Tymes et al. | | |
| 5,695,071 A * | 12/1997 | Ross et al. | | 209/616 |
| 5,768,384 A | 6/1998 | Berson | | |
| 5,793,030 A | 8/1998 | Kelly, Jr. | | |
| 5,895,073 A | 4/1999 | Moore | | |
| 5,917,925 A | 6/1999 | Moore | | |
| 6,005,960 A | 12/1999 | Moore | | |
| 6,041,929 A | 3/2000 | Brunner et al. | | |
| 6,111,953 A | 8/2000 | Walker et al. | | |
| 6,203,069 B1 | 3/2001 | Outwater et al. | | |
| 6,211,789 B1 | 4/2001 | Oldham et al. | | |
| 6,212,638 B1 | 4/2001 | Lee et al. | | |
| 6,226,619 B1 | 5/2001 | Halperin et al. | | |
| 6,231,435 B1 | 5/2001 | Pilger | | |
| 6,246,778 B1 | 6/2001 | Moore | | |
| 6,297,508 B1 | 10/2001 | Barmore et al. | | |
| 6,314,337 B1 * | 11/2001 | Marcum | | 700/216 |
| 6,329,920 B1 | 12/2001 | Morrison et al. | | |
| 6,342,839 B1 | 1/2002 | Curkendall et al. | | |
| 6,346,885 B1 | 2/2002 | Curkendall | | |
| 6,361,079 B1 | 3/2002 | Kirkman | | |
| 6,364,990 B1 | 4/2002 | Grosskopf et al. | | |
| 6,398,106 B1 | 6/2002 | Ulvr et al. | | |
| 6,409,082 B1 | 6/2002 | Davis et al. | | |
| 6,428,640 B1 | 8/2002 | Stevens et al. | | |
| 6,442,276 B1 | 8/2002 | Doljack | | |
| 6,456,729 B1 | 9/2002 | Moore | | |
| 6,473,739 B1 | 10/2002 | Showghi et al. | | |
| 6,536,672 B1 | 3/2003 | Outwater | | |
| 6,547,137 B1 | 4/2003 | Begelfer et al. | | |
| 6,612,494 B1 | 9/2003 | Outwater | | |
| 6,664,897 B2 | 12/2003 | Pape et al. | | |
| 6,680,783 B1 | 1/2004 | Pierce et al. | | |
| 6,766,324 B2 | 7/2004 | Carlson et al. | | |
| 6,788,800 B1 | 9/2004 | Carr et al. | | |
| 6,796,504 B2 | 9/2004 | Robinson | | |
| 6,805,926 B2 | 10/2004 | Cole et al. | | |
| 6,806,478 B1 | 10/2004 | Hatfield | | |
| 6,808,574 B1 | 10/2004 | Stevens et al. | | |
| 6,859,672 B2 | 2/2005 | Roberts et al. | | |
| 6,974,298 B2 | 12/2005 | Tanaka | | |
| 6,991,261 B2 | 1/2006 | Dronzek, Jr. et al. | | |
| 6,995,675 B2 | 2/2006 | Curkendall et al. | | |
| 6,996,543 B1 | 2/2006 | Coppersmith et al. | | |
| 7,009,723 B1 | 3/2006 | Bartholet et al. | | |
| 7,013,286 B1 | 3/2006 | Aggarwal et al. | | |
| 7,040,532 B1 | 5/2006 | Taylor et al. | | |
| 7,043,442 B2 | 5/2006 | Levy et al. | | |
| 7,207,481 B2 | 4/2007 | Barenburg et al. | | |
| 7,211,163 B2 | 5/2007 | Kennedy | | |
| 7,222,791 B2 | 5/2007 | Heilper et al. | | |
| 7,261,235 B2 | 8/2007 | Barenburg et al. | | |
| 7,277,601 B2 | 10/2007 | Zorab et al. | | |
| 7,283,630 B1 | 10/2007 | Doljack | | |
| 7,295,114 B1 | 11/2007 | Drzaic et al. | | |
| 7,321,310 B2 | 1/2008 | Curkendall et al. | | |
| 7,412,461 B2 | 8/2008 | Sholl et al. | | |
| 7,519,825 B2 | 4/2009 | Geoffrey | | |
| 7,686,513 B2 | 3/2010 | Knoerzer et al. | | |
| 7,705,735 B2 | 4/2010 | Pape et al. | | |
| 7,714,729 B2 | 5/2010 | Pape et al. | | |
| 7,766,240 B1 | 8/2010 | Grant | | |
| 7,810,726 B2 | 10/2010 | de la Huerga | | |
| 7,827,058 B2 | 11/2010 | Mortimer | | |
| 7,909,239 B2 | 3/2011 | Grant et al. | | |
| 8,019,662 B2 | 9/2011 | Lucas | | |
| 8,108,309 B2 | 1/2012 | Tan | | |
| 8,140,852 B2 | 3/2012 | Guenter et al. | | |
| 2001/0054005 A1 | 12/2001 | Hook et al. | | |
| 2001/0056359 A1 | 12/2001 | Abreu | | |
| 2002/0004767 A1 | 1/2002 | Okamoto et al. | | |
| 2002/0131442 A1 | 9/2002 | Garg et al. | | |
| 2002/0158765 A1 | 10/2002 | Pape et al. | | |
| 2002/0178363 A1 | 11/2002 | Ambrogio et al. | | |
| 2003/0019186 A1 * | 1/2003 | Hakansson | | 53/377.6 |
| 2003/0069772 A1 | 4/2003 | Roberts et al. | | |
| 2003/0080191 A1 | 5/2003 | Lubow et al. | | |
| 2003/0089078 A1 * | 5/2003 | Cristina | | 53/55 |
| 2003/0170357 A1 * | 9/2003 | Garwood | | 426/392 |
| 2003/0177025 A1 | 9/2003 | Curkendall et al. | | |
| 2003/0177095 A1 | 9/2003 | Zorab et al. | | |
| 2003/0185948 A1 * | 10/2003 | Garwood | | 426/392 |
| 2003/0221108 A1 | 11/2003 | Rupp | | |
| 2004/0065053 A1 * | 4/2004 | Rice et al. | | 53/445 |
| 2004/0159527 A1 * | 8/2004 | Williamson | | 198/459.1 |
| 2004/0167829 A1 | 8/2004 | Fujita | | |
| 2004/0200892 A1 | 10/2004 | Curkendall et al. | | |
| 2004/0205343 A1 | 10/2004 | Forth et al. | | |
| 2004/0230796 A1 | 11/2004 | Lundvall et al. | | |
| 2005/0004682 A1 * | 1/2005 | Gaddis et al. | | 700/9 |
| 2005/0038756 A1 | 2/2005 | Nagel | | |
| 2005/0075900 A1 * | 4/2005 | Arguimbau, III | | 705/1 |
| 2005/0082376 A1 * | 4/2005 | Lubow et al. | | 235/494 |
| 2005/0097054 A1 | 5/2005 | Dillon | | |
| 2005/0108044 A1 | 5/2005 | Koster | | |
| 2005/0182695 A1 | 8/2005 | Lubow et al. | | |
| 2005/0206586 A1 | 9/2005 | Capurso et al. | | |
| 2005/0247778 A1 | 11/2005 | Roberts | | |
| 2005/0251449 A1 | 11/2005 | Pape et al. | | |
| 2005/0288947 A1 * | 12/2005 | Mallonee et al. | | 705/1 |
| 2006/0004907 A1 | 1/2006 | Pape et al. | | |
| 2006/0022059 A1 | 2/2006 | Juds | | |
| 2006/0054682 A1 | 3/2006 | de la Huerga | | |
| 2006/0100964 A1 | 5/2006 | Wilde et al. | | |
| 2006/0111845 A1 * | 5/2006 | Forbis et al. | | 702/19 |
| 2006/0161443 A1 | 7/2006 | Rollins | | |
| 2006/0180661 A1 | 8/2006 | Grant et al. | | |
| 2006/0187048 A1 | 8/2006 | Curkendall et al. | | |
| 2006/0259182 A1 * | 11/2006 | Mantell | | 700/213 |
| 2006/0260495 A1 * | 11/2006 | Siedlaczek | | 101/494 |
| 2006/0266827 A1 | 11/2006 | Hamilton et al. | | |
| 2006/0289654 A1 | 12/2006 | Robinson et al. | | |
| 2007/0001006 A1 | 1/2007 | Schuessler et al. | | |
| 2007/0051362 A1 | 3/2007 | Sullivan et al. | | |
| 2007/0119954 A1 | 5/2007 | Barenburg et al. | | |
| 2007/0119955 A1 | 5/2007 | Barenburg et al. | | |
| 2007/0170240 A1 | 7/2007 | Grant et al. | | |
| 2007/0175974 A1 | 8/2007 | Self et al. | | |
| 2007/0203724 A1 | 8/2007 | Farmer et al. | | |
| 2007/0203818 A1 * | 8/2007 | Farmer et al. | | 705/35 |
| 2007/0205258 A1 | 9/2007 | Self et al. | | |
| 2007/0219916 A1 * | 9/2007 | Lucas | | 705/58 |
| 2008/0011841 A1 | 1/2008 | Self et al. | | |
| 2008/0011843 A1 | 1/2008 | Barenburg et al. | | |
| 2008/0023472 A1 * | 1/2008 | Brandt | | 220/4.23 |
| 2008/0030348 A1 | 2/2008 | Pape et al. | | |
| 2008/0046263 A1 | 2/2008 | Sager et al. | | |
| 2008/0143094 A1 | 6/2008 | Goetz | | |
| 2008/0178197 A1 | 7/2008 | Pape et al. | | |
| 2008/0215484 A1 | 9/2008 | Oldham | | |
| 2009/0242631 A1 * | 10/2009 | Wishnatzki et al. | | 235/385 |
| 2010/0106660 A1 | 4/2010 | Farmer et al. | | |
| 2010/0145730 A1 | 6/2010 | Abreu | | |
| 2012/0037697 A1 | 2/2012 | Boone et al. | | |

FOREIGN PATENT DOCUMENTS

| | | |
|---|---|---|
| JP | 2002140449 A2 | 5/2002 |
| WO | 03007252 A1 | 1/2003 |
| WO | 03060752 A1 | 7/2003 |
| WO | 2004075098 A1 | 9/2004 |
| WO | 2006084090 A2 | 8/2006 |
| WO | 2007140018 A2 | 6/2007 |

OTHER PUBLICATIONS

Secure Symbology, Inc. Business Overview, May 2008.
Paul Chang, IBM Industry Forum 2010, Mexico Industry Event, 2010.
U.S. Appl. No. 12/206,156 Office action, mailed Nov. 15, 2010.

U.S. Appl. No. 12/206,156 Applicants' Amendment A, filed Jan. 10, 2011.
PCT/US06/03768 International Search Report and Written Opinion, Jun. 12, 2008.
U.S. Appl. No. 12/501,240 Office action, mailed Jun. 7, 2011.
2/501,240 Applicants' Amendment A, filed Oct. 7, 2011.
U.S. Appl. No. 12/471,201 Office action, mailed Jul. 29, 2011.
U.S. Appl. No. 12/471,201 Applicants' Amendment A, filed Oct. 7, 2011.
U.S. Appl. No. 11/743,648, Matthew Self, System and Method of Product Information Coding and Authentication, May 2, 2007.
U.S. Appl. No. 11/770,567, Matthew Self, System and Method of Detecting Product Code Duplication and Product Diversion, Jun. 28, 2007.
U.S. Appl. No. 11/612,191, Elliott Grant, Method and System for Deterring Product Counterfeiting, Diversion and Piracy on a Single System, Dec. 18, 2006.
U.S. Appl. No. 12/143,016, Elliott Grant, Duo Codes for Product Authentication, Jun. 20, 2008.
U.S. Appl. No. 12/143,085, Elliott Grant, Systems and Methods for Employing Duo Codes for Product Authentication, Jun. 20, 2008.
U.S. Appl. No. 13/053,200, Elliott Grant, Attributing Harvest Information with Unique Identifiers, Mar. 21, 2011.
U.S. Appl. No. 13/034,208, Elliott Grant, Methods for Assigning Traceability Information to and Retrieving Traceability Information from a Store Shelf, Feb. 24, 2011.
U.S. Appl. No. 13/004,173, Elliott Grant, Systems and Methods for using a Search Engine to Implement Product Traceability, Jan. 11, 2011.
U.S. Appl. No. 12/908,667, Elliott Grant, Methods for Correlating First Mile and Last Mile Product Data, Oct. 20, 2010.
U.S. Appl. No. 12/877,467, Elliott Grant, Lot Identification Codes for Packaging, Sep. 8, 2010.
U.S. Appl. No. 12/850,909, Elliott Grant, Method and System for Deterring Product Counterfeiting, Diversion and Piracy, Aug. 5, 2010.
U.S. Appl. No. 12/689,949, Elliott Grant, Voice Code with Primary and Secondary Digits, Jan. 19, 2010.
U.S. Appl. No. 12/580,506, Elliott Grant, Method and System for Deterring Product Counterfeiting, Diversion and Piracy, Oct. 16, 2009.
U.S. Appl. No. 12/576,092, Elliott Grant, Voice Code for Distribution Centers, Oct. 8, 2009.
U.S. Appl. No. 12/501,240, Elliott Grant, Mobile Table for Implementing Clamshell-to-Case Association, Jul. 10, 2009.
U.S. Appl. No. 12/359,151, Elliott Grant, Adding Traceability Codes to Produce Labels without Increasing the Size thereof, Jan. 23, 2009.
U.S. Appl. No. 12/471,201, Elliott Grant, Case Labeling for Field-Packed Produce, May 22, 2009.
U.S. Appl. No. 13/221,520, Elliott Grant, Case Labeling for Field-Packed Produce, Aug. 30, 2011.
"CRC: Implementation," http://www.relisoft.com/science/CrcNaive.html, @2006.
Ilic, A. et al., "The Value of Sensor Information for the Management of Perishable Goods—A Simulation Study" (Jun. 4, 2008), http://www.im.ethz.ch/publications/ilic_voi_perishables_perceived_quality_0608.pdf.
Roberti, M., "RFID Will Help Keep Perishables Fresh" (Aug. 3, 2005), RFID Journal, www.rfidjournal.com/article/view/1775.
Yoichi Shibata et al., "Mechanism-based PKI," Computer System Symposium 2003, vol. 2003 (15), pp. 181-186, (1998).

* cited by examiner

SYSTEMS AND METHODS OF ASSOCIATING INDIVIDUAL PACKAGES WITH HARVEST CRATES

CROSS-REFERENCE TO RELATED APPLICATIONS

This application claims the benefit of, and incorporates by reference, U.S. Provisional Patent Application No. 61/028,163 filed on Feb. 12, 2008 and titled "Systems and Methods of Associating Individual Packages with Harvest Crates." This application is related to, and also incorporates by reference U.S. Provisional Patent Applications No. 60/970,933 filed on Sep. 7, 2007 and titled "Attributing Harvest Information with Unique Identifiers," and No. 61/080,121 filed on Jul. 11, 2008 and titled "Mobile Table for Implementing Clamshell-to-Case Association." This application is also related to U.S. patent application Ser. No. 12/176,334 filed on Jul. 19, 2008 and titled "Case-Level Traceability Without the Need for Inline Printing," now U.S. Pat. No. 7,766,240, which is also incorporated herein by reference.

BACKGROUND

Produce is often packaged in unit packaging such as bags and clamshells. Clamshells provide retailers a standard merchandizing unit that protects the produce, offer brand owners a labeling opportunity, and offer consumers convenience. Labels on clamshells commonly convey brand information, product graphics, or the like. Clamshells typically arrive at the harvest location pre-labeled so that the clamshells can be efficiently filled and then rapidly moved into the distribution chain.

FIG. 1 schematically illustrates a typical prior art distribution chain 100 for clamshells from their manufacture to their deployment to a harvest for produce packaging. As shown in FIG. 1, clamshells are manufactured by a manufacturer 110 using a thermal process. Following manufacture the clamshells are typically labeled and nested together in stacks, where the stacks include about 400 clamshells in some instances. Stacks of nested labeled clamshells are transported from the manufacturer 110 in bulk containers 120.

For greater harvesting efficiency, labeled clamshells are removed from the bulk containers 120 and placed in harvest crates 140 at a facility 130, generally located in the vicinity of the harvest site. A harvest crate 140 is a carrier designed to carry a number of filled clamshells through a distribution chain to a retailer. Harvest crates 140 are sometimes also referred to as cases, trays, or flats. A stocking machine is commonly used to select the correct number of nested clamshells, such as 8 or 12, from a stack and transfer these still-nested clamshells to harvest crates 140. It is common practice to put just the correct number of nested clamshells into each harvest crate 140 so that each harvest crate 140 is full when it leaves the field. For example, a harvest crate 140 may hold 8 clamshells in two rows of four. In this case, 8 nested clamshells are placed in each harvest crate 140 prior to delivery to the harvest site. Harvest crates 140, each including the proper number of nested labeled clamshells, are then banded together to form columns 150 of harvest crates 140. At the harvest site, a picker takes a harvest crate 140, de-nests the clamshells, fills each with produce, and then packs the clamshells into two rows in the harvest crate 140.

SUMMARY

Various embodiments of the invention include systems and methods of associating individual unit packaging, such as clamshells, with the particular harvest crate or other container in which they are placed. This association may be used, for example, to provide traceability of produce from the field to the consumer.

An exemplary system of the invention is used for associating containers, such as harvest crates, with a number of unit packages distributed therein, such as clamshells. The exemplary system comprises a first conveyor configured to convey containers, where each container is labeled with a unique first code. The exemplary system also comprises a second conveyor configured to convey unit packages, where each unit package is labeled with a unique second code. A first reader is disposed proximate to the first conveyor and is configured to read the first codes from the passing containers. A second reader is disposed proximate to the second conveyor and is configured to read the second codes from the passing unit packages. The first and second readers can comprise bar code scanners, for example. The system further comprises association logic in communication with the first and second readers. The association logic is configured to associate a plurality of second codes with each first code. Various embodiments further comprise data storage in communication with the association logic, and in these embodiments the association logic is configured to store the plurality of second codes in association with each first code.

Some embodiments of the exemplary system further comprise a nesting device. The nesting device is configured to accumulate unit packages received from the second conveyor into a nested stack of a predetermined quantity and is further configured to output the accumulated unit packages into one of the containers. Various embodiments of the exemplary system further comprise a labeler, such as a printer, disposed proximate to the second conveyor and configured to label the passing unit packages with the second codes. The labeler, in some of these embodiments, is configured to apply adhesive labels to the unit packages, where each adhesive label includes a unique second code. Various embodiments of the exemplary system further comprise a labeler disposed proximate to the first conveyor and configured to label the passing containers with the first codes. In some of these embodiments the labeler is configured to print the first codes on the containers. Still other embodiments further comprise a harvest crate assembler configured to assemble containers, comprising harvest crates, from cardboard stock and further configured to output the completed containers onto the first conveyor.

An exemplary method of the invention is directed to associating containers such as harvest crates with unit packages distributed therein, such as clamshells. The exemplary method comprises reading a first code from a container configured for transporting a plurality of unit packages, reading a unique second code from each of the plurality of unit packages, storing an association between the first code and the unique second codes, and placing the plurality of unit packages into the container. In some embodiments of the exemplary method, unit packages are un-filled when the unique second codes are read and when the unit packages are placed in the container. Some of these embodiments further comprise nesting together the un-filled unit packages after reading the unique second codes and before placing the un-filled unit packages in the container.

In various embodiments the exemplary method further comprising receiving a stack of nested unit packages and singulating the unit packages from the stack before reading the unique second codes. In some of these embodiments the method further comprises labeling each of the plurality of unit packages with a unique second code after singulating the unit packages, and in some of these embodiments labeling each of the plurality of unit packages with the unique second code comprises adhering to each of the plurality of unit packages a pre-printed label that includes the unique second code.

In various embodiments, this exemplary method further comprises assembling the container from cardboard stock before reading the first code from the container. In some of these embodiments the method further comprises labeling the container with the first code after assembling the container and before reading the unique first code.

Another exemplary method of the invention is direct to packaging harvested produce. This exemplary method comprises receiving a plurality of nested un-filled clamshells, labeling the plurality of un-filled clamshells each with a unique first code, labeling a harvest crate with a second code, storing an association between the second code and the unique first codes, filling each of the plurality of clamshells with harvested produce, and packing the plurality of filled clamshells into the harvest crate. In some embodiments, storing the association between the second code and the unique first codes comprises reading the unique first codes from the plurality of un-filled clamshells and reading the second code from the harvest crate.

In various embodiments, the exemplary method further comprises fabricating the harvest crate before labeling the harvest crate with the second code. Various embodiments also comprise placing the plurality of un-filled clamshells in the harvest crate after labeling the plurality of un-filled clamshells. In some embodiments the method further comprises storing an association between the second code and a column code used to identify a column of harvest crates. In further embodiments, the method also comprises storing an association between the second code and harvest data and/or storing an association between the second code and a picker identification.

DETAILED DESCRIPTION

Figure 1:
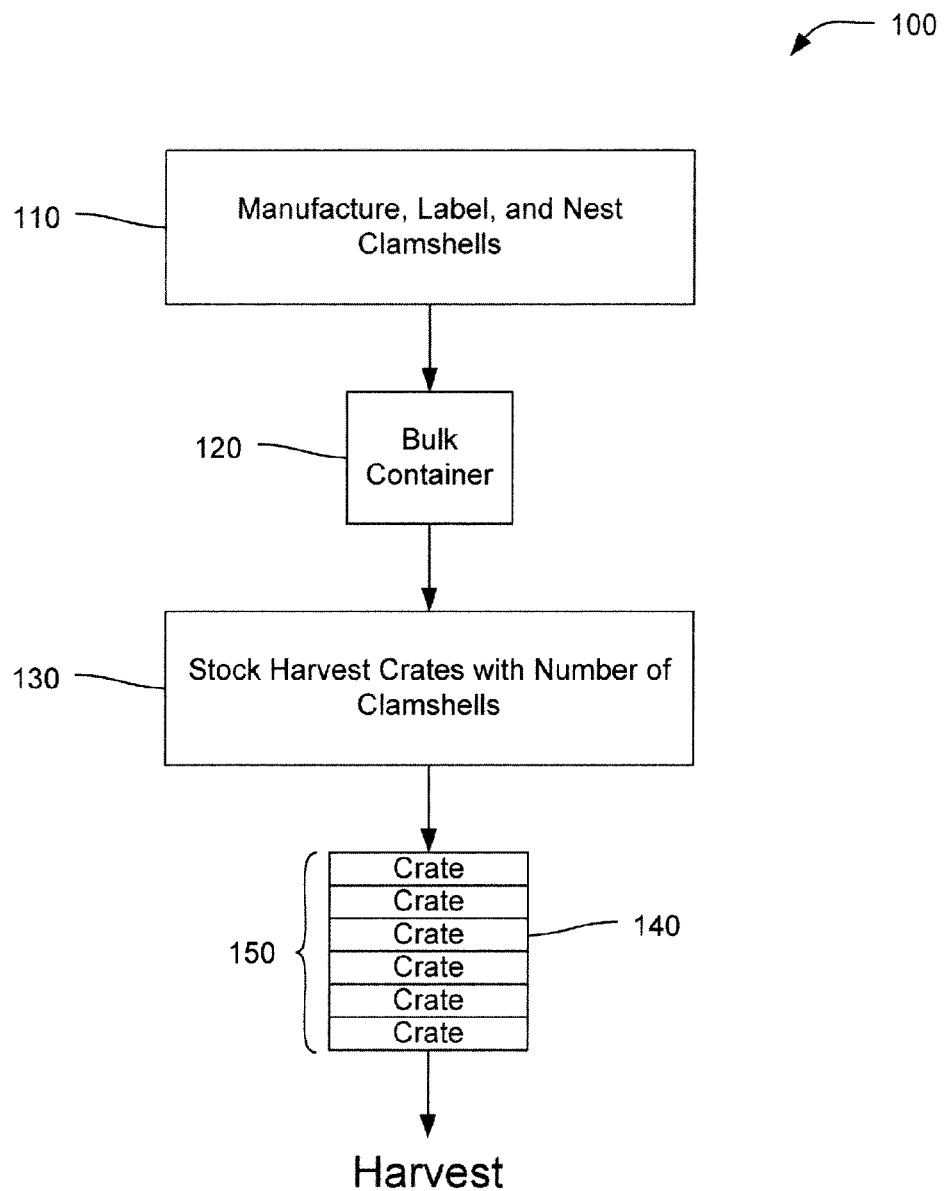
FIG. 1 illustrates a typical prior art distribution chain for clamshells from manufacture to deployment at a harvest.

The present invention places unique codes on clamshells or other unit packages, places crate codes on harvest crates 140 or other containers, and creates associations between these codes for improved traceability through the distribution chain. Unique codes can be printed directly onto the clamshells or can be pre-printed on labels that are adhered to the clamshells. Similarly, the crate codes can be printed directly onto the harvest crates 140 or can be pre-printed on labels that are adhered to the harvest crates 140. Proximate to the time that the clamshells are transferred to the harvest crates 140 the unique codes are associated with the crate codes. The additional labor associated with labeling and associating clamshells with harvest crates is performed outside of the harvest and therefore does not impact picker productivity. To the extent that the processes described herein can be automated, such additional labor can be minimized.

The exemplary embodiments provided herein are specifically directed to those instances where the unit packages comprise clamshells for produce, however, it will be understood that the same concepts apply equally to any unit package that can be nested together when empty, and regardless of the end use of the packaging, whether for produce or other food items like baked goods, or generally any other consumer goods. Likewise, although the exemplary embodiments provided herein are specifically directed to those instances where harvest crates are used to transport filled clamshells from the fields, the same concepts apply equally to any containers in which a fixed number of unit packages are routinely distributed.

U.S. patent application Ser. Nos. 11/347,424, 11/619,747, 11/743,648, 11/743,652, 11/770,567, 11/612,191 and 11/612,209 disclose coded labels that are suitable for use in the present invention. In some embodiments, each of these labels include a unique code that is an encryption of a plain text code. The plain text codes can be generated to follow a sequence, for example, but the encryptions of these codes on the labels appear to be random. In order to provide food traceability it is desirable to be able to associate each individual unit package of produce with a harvesting event, picker, location, distributor, times and dates, and/or the like information. To associate each clamshell with this information in the field, one could read each label from each filled clamshell as it is packed in a harvest crate. However, this is labor intensive and requires that pickers each have a label reader that they use as they fill their harvest crates. Alternatively, if an association is known between all the labels in each harvest crate, then reading just one of these labels, or a label on the harvest crate itself, is sufficient to identify all of the labels in the harvest crate. Where the labels on the clamshells in a harvest crate 140 bear unique codes that are encryptions of sequential plain text codes, an association exists between those unique codes. Various embodiments of the invention described herein include systems and methods of providing the further association between the unique codes on the clamshells and the crate codes on the harvest crates 140.

Figure 2:
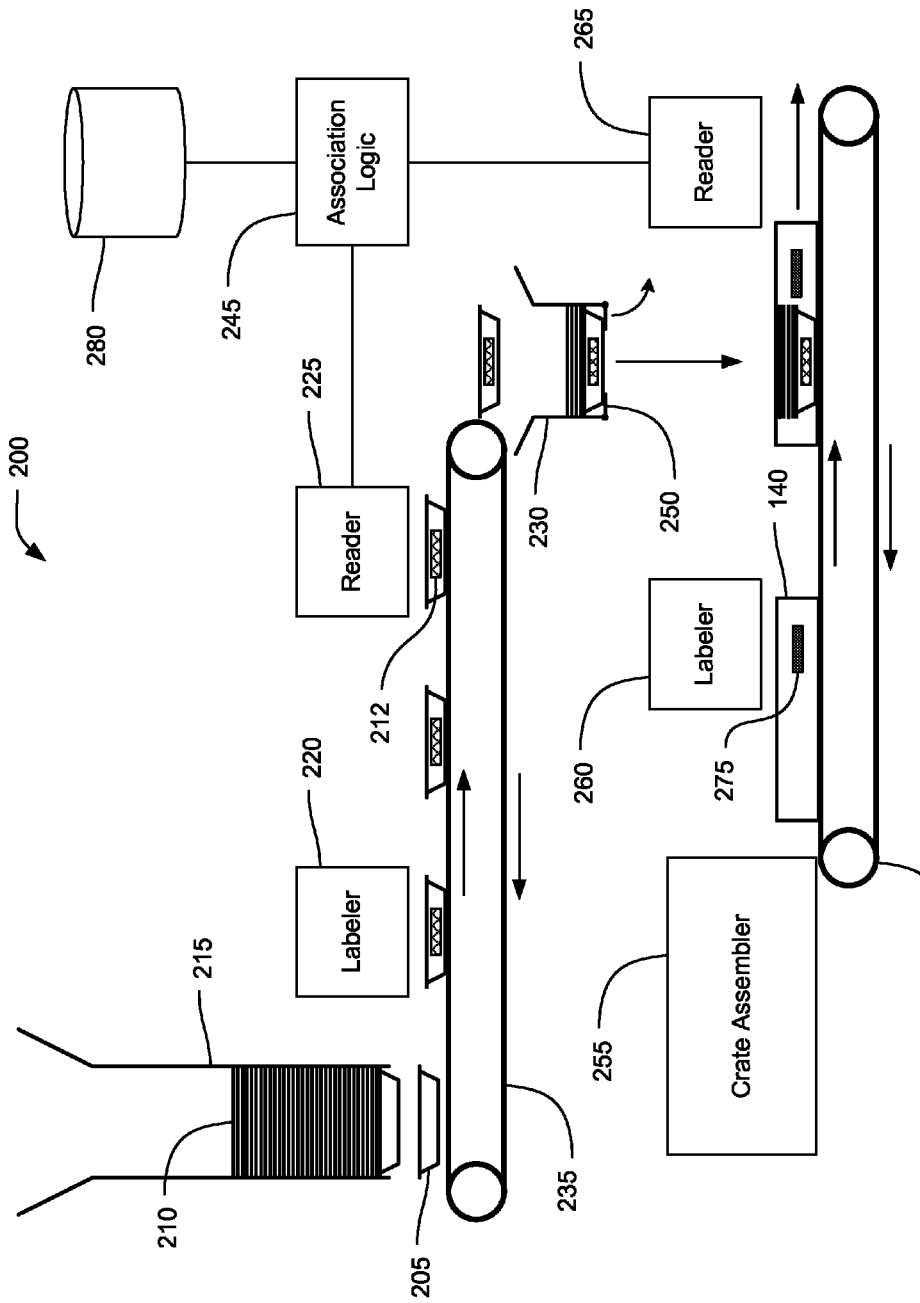
FIG. 2 illustrates a system configured for associating individual clamshells with harvest crates, according to various embodiments of the invention.

FIG. 2 illustrates an exemplary system 200 for associating individual unit packages, such as clamshells 205, with harvest crates 140, according to various embodiments of the invention. System 200 can be implemented in facility 130, for example. System 200 brings together two process flows. In a first process flow clamshells 205 are singulated from a stack 210, labeled, unique codes on the labels are read, and then the clamshells 205 are re-nested. In a second process flow harvest crates 140 are assembled, labeled with crate codes, and filled with re-nested clamshells 205 from the first process flow. The second process flow also includes reading the crate codes from the crate labels. The unique codes are then associated with the crate codes and the associations are stored for later use.

In some embodiments, the system 200 comprises a singulator 215, a labeler 220, a reader 225, a nesting device 230, and a conveyor 235 for performing the first process flow, described above. The singulator 215 receives stacks 210 of clamshells 205, de-nests the clamshells 205 one at a time, and drops the singulated clamshells 205 onto the conveyor 235. It will be appreciated that the singulator 215 is optional in system 200 in as much as clamshells 205 can be manually singulated and placed on the conveyor 235.

Figure 3:
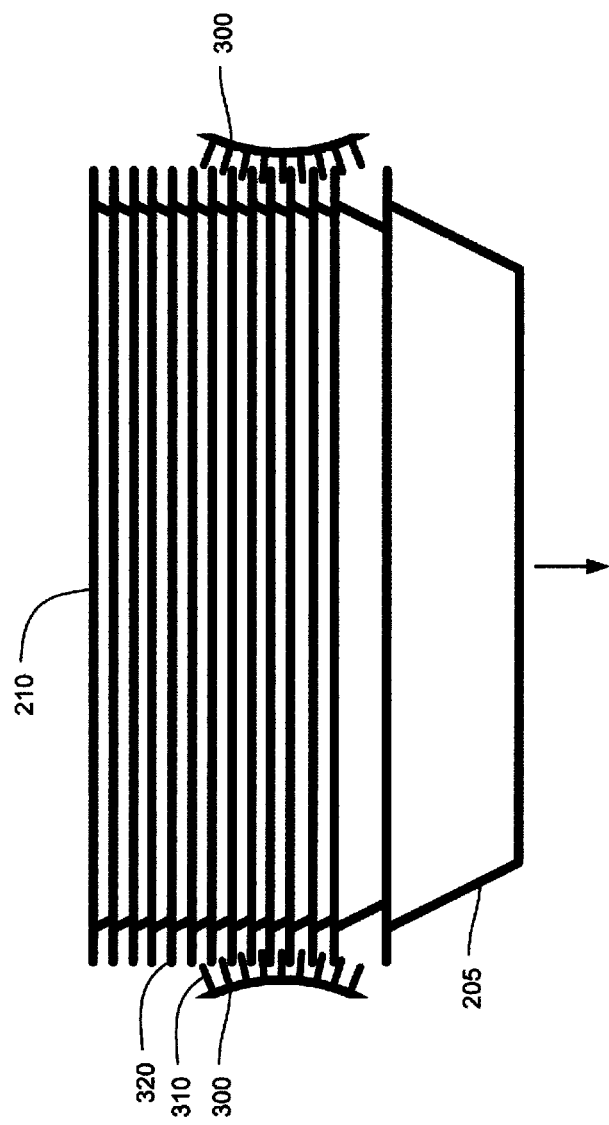
FIG. 3 illustrates the operation of an exemplary singulator for de-nesting clamshells according to various embodiments of the invention.

In some embodiments, as illustrated by FIG. 3, the singulator 215 comprises two opposing toothed wheels 300 or toothed belts where the teeth 310 are properly sized to the spacings between adjacent lips 320 of the clamshells 205 in the stack 210. The teeth 310 also are formed of a material having appropriate flexibility and hardness to be able to engage between adjacent lips 320 without damaging the lips 320. In some embodiments, the opposing wheels 300 or belts are configured to engage the stack 210 of clamshells 205 such that a fold line of the clamshells 205, the line along which the halves of the clamshells 205 are designed to fold, runs parallel to a line between the opposing wheels 300 (i.e., the fold line runs horizontally in the plane of the drawing in FIG. 3). In still other embodiments the singulator 215 comprises cam-driven reciprocating fingers that separate and push down the bottom clamshell 205. In further embodiments the singulator 215 includes an auger device that de-nests clamshells 205 by engaging between the lips 320 of the clamshells 205 in the stack 210.

Returning to FIG. 2, the conveyor 235 carries the individual clamshells 205 from the singulator 215 to the labeler 220. The labeler 220 can comprise a label applicator, a laser inscriber, an inkjet printer, or the like, in various embodiments. The labeler 220 labels each clamshell 205 with a unique code, for example by applying a label 240 that includes the unique code, as described above. The unique code can be provided in a machine-readable format such as a bar code. In some of these embodiments, the labels 240, including the unique codes, are pre-printed, while in other embodiments the labels 240 are pre-printed except for the unique codes which are printed on the labels 240 by the labeler 220. In still other embodiments the labeler 220 prints the entire label 240, including the unique code, before adhering the labels 240 to the clamshells 140. In yet further embodiments, the labeler 220 is configured to label each clamshell 205 with a unique code by printing or inscribing the unique codes directly onto the clamshells 205. In some of these embodiments, the clamshells 205 are received from the manufacturer 110 pre-labeled with labels 240 that do not include a unique code, and the labeler 220 prints a unique code on each. Techniques for employing secure printers to electronically receive unique codes and print those codes either onto labels or directly onto packaging are discussed in U.S. patent application Ser. No. 12/143,016. In still additional embodiments, labels 240 include RFID tags and the unique codes are stored to the RFID tags. Unique codes stored by RFID tags are also machine-readable. The unique codes can be pre-stored to the RFID tags or stored to the RFID tags by the labeler 220, in various embodiments.

It should be noted that the labeler 220 is also optional in system 200 in as much as the clamshells 205 can be pre-labeled by the manufacturer 110 with labels 240 that include the unique codes. There are advantages, however, in labeling clamshells 205 just prior to use, rather than long in advance, where the labels 240 carry additional information (e.g., organic status, choice of language, etc.) beyond simply the unique code. For example, if a harvester orders in advance a bulk quantity of pre-labeled clamshells 205 and the harvest is diminished by the weather, then many of the pre-labeled clamshells 205 will be wasted. Other factors including rapidly changing market conditions make it desirable to be able to select an appropriate label 240 shortly before harvesting.

The conveyor 235 next carries the labeled clamshells 205 by the reader 225. The reader 225 can comprise a bar code scanner, an optical character recognition device, a radio receiver, or the like. The reader 225 is situated relative to the conveyor 235 such that the unique codes on the labels 240 can be read as the clamshells 205 are translated passed the reader 225. The reader 225 is in communication with association logic 245 which receives the unique codes read by the reader 225. The operation of the association logic 245 is discussed in greater detail below. The reader 225 is optional in those embodiments where the unique codes are printed by the labeler 220, rather than being pre-printed on labels. In these instances, the labeler 220 is in communication with the association logic 245 and provides the unique codes to the association logic 245 as the unique codes are used.

The conveyor 235 next carries the labeled clamshells 205 to the nesting device 230. The nesting device 230 is configured to accumulate clamshells 205 and to output these clamshells 205 in a nested stack of a predetermined quantity such as in groups of 6, 8, 12, 16, etc. An exemplary nesting device 230 includes bomb-bay doors 250 that open to release the stack of clamshells 205 once the stack includes the predetermined quantity. In some embodiments, the nesting device 230 includes a mechanism to determine the number of accumulated clamshells 205, for example, by the accumulated weight of the clamshells 205 or by counting the incoming clamshells 205 with an optical sensor. In other embodiments, the system 200 includes control logic (not shown) configured to count the number of reads made by the reader 225 and to control the nesting device 230 accordingly.

In some embodiments, the system 200 further comprises a crate assembler 255, a labeler 260, a reader 265, and a conveyor 270 for performing the second process flow, described above. The crate assembler 255 is configured to receive die cut cardboard stock and fabricate the cardboard stock into harvest crates 140 which are dispensed onto the conveyor 270. The crate assembler 255 is optional in the system 200 in as much as pre-assembled harvest crates 140 can be manually or robotically placed on the conveyor 270.

The conveyor 270 transports the harvest crates 140 to the labeler 260 which provides a crate code to each harvest crate 140. The labeler 260 can comprise a label applicator, a laser inscriber, an inkjet printer, or the like, in various embodiments. Like the unique codes of the labels 240, each crate code is also unique. However, in some embodiments, the crate codes are not encryptions of underlying plain codes and can simply comprise serialized numbers, for example. The crate codes can be provided in a machine-readable format such as a bar code. The labeler 260, like the labeler 220, can adhere pre-printed labels 275 that include the crate code, or can print crate codes directly onto the harvest crates 140, for instance. Also as above, the crate codes can be stored in RFID tags. In some embodiments, the labeler 260 is a component of, or integral with, the crate assembler 255. The labeler 260 is optional in system 200 in as much as the as-received cardboard stock can be pre-labeled with the crate codes prior to being formed into harvest crates 140.

The conveyor 270 also transports the harvest crates 140 beneath the nesting device 230 to receive the nested stack of the predetermined quantity of clamshells 205. The system 200 can comprise a mechanism, such as an optical detector disposed proximate to the conveyor 270, configured to control the operation of the nesting device 230 according to the position of the harvest crate 140 so that the nested stack is released at the correct moment. It will be appreciated that while the nesting device 230 described herein merely drops the nested stack of clamshells 205 into the harvest crates 140, other mechanisms can be implemented to effectuate the transfer.

The conveyor 270 also transports the harvest crates 140 by the reader 265 which reads the crate code from each label 275 and communicates the same to the association logic 245. The reader 265 can comprise a bar code scanner, an optical character recognition device, a radio receiver, or the like. The association logic 245 associates the unique codes read from the labels 212 on the clamshells 205 in the released nested stack with the crate code read from the label 275 on the receiving harvest crate 205 and stores the association, for example, in a data storage 280. These associations may be viewed as parent (crate code)-child (unique codes) relationships. In some embodiments, the association logic 245 associates and stores other information with the unique codes and crate codes such as a time stamp. In some embodiments, the unique codes on the clamshells 205 are associated with a group identifier. A group identifier is a value that can be used to identify each group. For example, a group identifier may be an index value in a database. The group identifier is optionally treated as a code for which no label exists, e.g., a virtual code, and that has a parent-child relationship with the codes of the clamshells 205.

The association logic 245 can comprise hardware, firmware and/or software stored on a computer readable medium, in some embodiments. For example, association logic 245 can include a microprocessor, data storage, a database application and scripts configured to store the associated unique codes and crate codes in the data storage 280. The data storage 280 can comprise, in various embodiments, volatile memory, static memory, an optical recording medium, a magnetic recording medium, a hard drive, random access memory, and/or the like.

It will be appreciated that several variations of the order of the second process flow are possible. For instance, in an alternative embodiment, the system 200 is configured such that the conveyor 270 passes the harvest crates 140 beneath the nesting device 230 before the labeler 260. In another alternative embodiment, the system 200 is configured such that the conveyor 270 passes the harvest crates 140 by the reader 265 before passing the harvest crates beneath the nesting device 230. Additionally, the reader 265 is optional in those embodiments where the crate codes are printed on the harvest crates 140, rather than being pre-printed on labels or on the as-received cardboard stock. In these instances, the labeler 260 is in communication with the association logic 245 and provides the crate codes to the association logic 245 as the crate codes are used. Harvest crates 140 including nested clamshells 205 are optionally stacked together to form a column, and columns can be banded. Columns may be stacked on pallets for delivery to the fields for harvesting.

Figure 4:
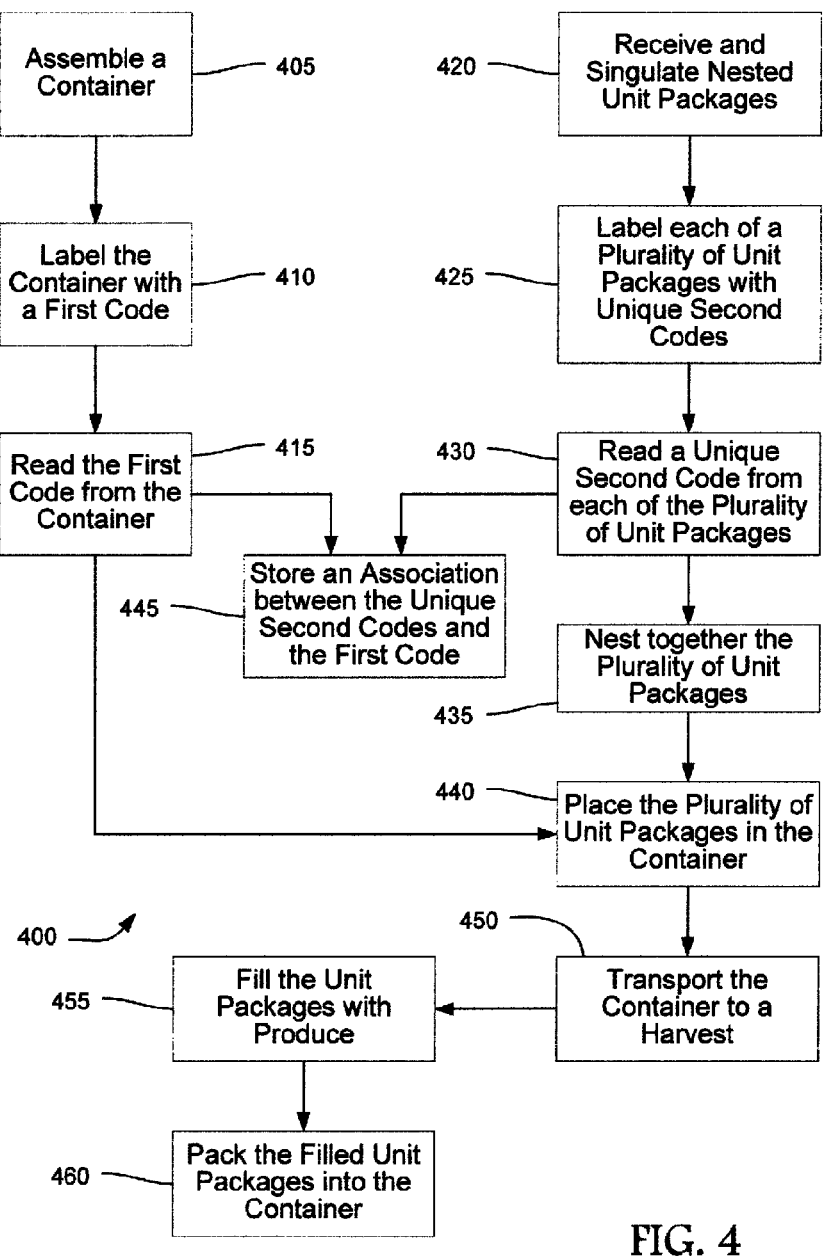
FIG. 4 illustrates a method of associating individual packages with harvest crates, according to various embodiments of the invention.

FIG. 4 illustrates a method 400 of associating a plurality of unit packages with a container, according to various embodiments of the invention. Method 400 can be used for packaging harvested produce in clamshells 205 for distribution in harvest crates 140, for example. One benefit of making and storing this association is that information associated with the harvest crate 140 can be inherited by the clamshells 205. The association also provides traceability such that a harvest crate 140 can be identified from any clamshell 205, and through that harvest crate 140 all other clamshells 205 can also be identified.

The method 400 combines two process flows, one for a container such as a harvest crate 140 and one for unit packages such as clamshells 205. In various embodiments, the process flow for the container can comprise some or all of a step 405 of assembling the container, a step 410 of labeling the container with a first code, and a step 415 of reading the first code from the container. In various embodiments, the process flow for the unit packages can comprise some or all of a step 420 of receiving and singulating unit packages, a step 425 of labeling each of a plurality of unit packages with unique second codes, a step 430 of reading a unique second code from each of the plurality of unit packages, and a step 435 of nesting together the plurality of unit packages. The two process flows come together at a step 440 of placing the plurality of nested unit packages in the container and a step 445 of storing an association between the unique second codes and the first code. The method 400 can further comprise, in some embodiments, some or all of a step 450 of transporting the container to a harvest, a step 455 of filling the unit packages with produce, and a step 460 of packing the filled unit packages into the container.

Step 405 is an optional step of assembling the container, which can comprise fabricating a harvest crate 140 from cardboard stock, in some embodiments. Fabricating the harvest crate 140 can comprise steps of folding and gluing the cardboard stock, for example, and can be performed manually or by a crate assembler 225. Some embodiments of the method 400 do not include step 405, and in these embodiments the container process flow can begin by receiving pre-assembled containers.

In step 410 the container is labeled with a first code, such as the crate codes noted above. Labeling the container can comprise printing the first code on the container, such as with an inkjet printer, or adhering a label including the first code to the container, such as with a label applicator. In some embodiments that comprise adhering a label to the container, the first code can be pre-printed on the label. In other instances, adhering the label to the container includes printing the code on the label. The first code can be machine readable, for example, and can comprise a bar code or a graphic symbology according to a standard such as Databar, PDF417, QR Code, or Data Matrix. Labeling the container in step 410 is unnecessary in those embodiments where pre-assembled containers are used, and those pre-assembled containers are already labeled with the first code.

Step 415 comprises reading the first code from the container such as with a bar code scanner or optical character recognition system. Reading the first code can include communicating the first code to association logic 245. In some embodiments step 415 is optional, such as in those embodiments where step 410 comprises printing the first code on the container. In these instances communicating the first code to association logic 245 can be part of step 410.

Step 420 comprises receiving nested unit packages and singulating the same. In some embodiments, receiving nested unit packages comprises receiving a bulk container including stacks of nested clamshells 205. In these embodiments, singulating the unit packages can comprise separating individual clamshells 205 from a stack. Singulating can be performed manually or by machine, such as with the singulator 215 described with respect to FIGS. 2 and 3.

Step 425 comprises labeling each of a plurality of unit packages with unique second codes, such as the unique codes for labeling clamshells 205 described above. Labeling the unit packages can comprise printing the unique second codes on the unit packages, such as with an inkjet printer, or adhering labels each including a unique second code to the unit packages, such as with a label applicator. In some embodiments that comprise adhering labels to the unit packages, the unique second codes can be pre-printed on the labels. In other instances, adhering labels to the unit packages includes printing a unique second code on each label. The unique second code can be machine readable, for example, and can comprise a bar code or a graphic symbology according to a standard such as PDF417, QR Code, or Data Matrix. Labeling the unit packages in step 425 is unnecessary in those embodiments where the as-received unit packages are already labeled with the unique second codes.

In step 430 a unique second code is read from each of the plurality of unit packages. Unique second codes can comprise the unique codes described above for labeling clamshells 205. The plurality can comprise a number such as 4, 6, 8, 12, or 16, for example, and represents the number of filled unit packages that can be arranged within the container for distribution. Reading the second codes can be performed with a bar code scanner or optical character recognition system, in some embodiments, and can also include communicating the second codes to association logic 245. In some embodiments step 430 is optional, such as in those embodiments where step 420 comprises printing the second codes on the unit packages. In these instances communicating the second codes to the association logic 245 can be part of step 425.

In step 435 the plurality of labeled un-filled unit packages are nesting together, for example with nesting device 230. Nesting the unit packages together can comprise, in some instances, accumulating the plurality of unit packages into a stack of 6, 8, 12, 16, etc.

Step 440 comprises placing the plurality of nested unit packages into the container. Step 440 can include releasing the plurality of nested unit packages above the container as the container passes beneath on a conveyor, for example. Accordingly, step 440 can comprise coordinating the movement of the container with the nesting of the unit packages in step 435.

Step 445 comprises storing an association between the unique second codes and the first code. For example, the association can be stored in a database maintained on a storage device 280. In some embodiments the association is a parent-child association where the first code represents the parent and the unique second codes represent the children. Step 445 can further comprise storing other information in association with the unique second codes and the first code such as a time stamp, harvest data, and further hierarchical associations. For instance, the containers can be grouped together into columns, stacks, pallets, and so forth, and these can be further aggregated into other assemblages. Each grouping can be assigned a unique code that is marked on the grouping and stored in association with the first codes of the containers therein. Storing associations in step 445 can be accomplished online, or in an offline batch process.

In various embodiments, the first codes of the containers can be associated with harvest data by recording the data on a harvest form. Exemplary harvest forms are described in U.S. patent application Ser. No. 12/206,156 filed Sep. 8, 2008 and entitled "Attributing Harvest Information with Unique Identifiers" which is incorporated herein by reference. In some embodiments the harvest form includes a harvest form code that can be machine-readable, human-readable, or both. A bar code scanner, for example, can be used to first scan the harvest form code and then used to scan the first codes on a number of containers. Every container code scanned after the harvest form code is associated with that harvest form. Subsequently, harvest data recorded on the harvest form can be associated with the harvest form code and through the association with each of the first codes of the containers.

As another example, containers can be grouped together in columns and each column can be given a unique column code that is printed on a detachable label. An association of the first codes of the containers with the column code can be stored in the data storage 280. When the containers of the column are used, the detachable label including the column code is removed from the column and attached to the harvest form. Subsequently, harvest data recorded on the harvest form can be associated with the column code and through the association with each of the first codes of the containers.

In various embodiments, harvest data can also be related to a labor event by way of the stored associations described above. For example, a picker presents a harvest crate 140 of harvested produce at a packing station or other location in the field. The first code from the harvest crate 140, or a single clamshell 205 therein, is scanned and the picker's identity is also collected. Identity collection can be accomplished by scanning a bar code, or reading an RFID chip, located on the picker's badge, ID card, or wristband, or by manual data entry. Because all the clamshells 205 in the harvest crate 140 can be determined from reading the first code or a single unique second code, all the clamshells 205 can be associated with the picker. This has at least two benefits. First, each clamshell 205 can be associated with the specific picker that carried out the harvest. This is useful in tracing food safety issues associated with human borne pathogens, for example. If a picker becomes ill or is diagnosed with a disease related to food safety issues, all clamshells 205 harvested by that picker can be identified and proper recall actions can be initiated. Further, if contaminated produce is traced to a particular clamshell 205, that clamshell 205 can be tied back to the specific picker responsible for the harvest.

In addition to the traceability benefit, associating harvest data with the labor event allows the grower to compute piece rate payment. The collected harvest data can be used to determine payment, performance by an employee over time, and other such labor and harvest trends. Further, by collecting unit-level quality data from the consumer, as described in various applications incorporated herein by reference, trends affecting quality and consumer preferences can be linked to both the harvest generally, and the picker specifically.

Further, codes placed on pallets, columns of containers, or other assemblages can be scanned at various points in the distribution process to associate shipping information with the unit packages. In this way growers and shippers can accomplish "trace forward" to know, for example, both intended and actual destinations for the unit packages. Further, wholesalers, distributors, and retailers can access traceability information extending back through the distribution chain back to the harvest from the unique second codes on the unit packages, from first codes on containers, and from codes on other assemblages.

In some embodiments, the method 400 also comprises any or all of the optional steps 450 of transporting the container to a harvest, 455 of filling the unit packages with produce, and 460 of packing the filled unit packages into the container. In some embodiments, step 455 comprises taking a harvest crate 140 from a column, removing a plurality of clamshells 205 from the harvest crate 140, de-nesting the plurality of clamshells 205, and filling each clamshell 205 with produce. In some embodiments, step 460 comprises packing the filled clamshells 205 back into the harvest crate 140 in one or more rows.

Several embodiments are specifically illustrated and/or described herein. However, it will be appreciated that modifications and variations are covered by the above teachings and within the scope of the appended claims without departing from the spirit and intended scope thereof. For example, while clamshells have been used as an example herein, the systems and methods disclosed herein may be applied to any type of unit packaging. This unit packaging may be configured to hold a single item or a group of items, such as a group of berries or a group of tomatoes. Further, while the labels disclosed in U.S. patent application Ser. Nos. 11/347,424, 11/619,747, 11/743,648, 11/743,652, 11/770,567, 11/612, 191 and/or 11/612,209 are discussed herein by way of example, the systems and methods disclosed herein may be used with other labels and codes. Further, while the examples provided herein relate to individual unit packaging and harvest crates, the systems and methods disclosed herein may be applied to other types of crates or assemblies. For example, the systems and methods may be applied to columns and/or pallets of harvest crates. As such, unit packaging may be associated with columns and/or pallets of harvest crates.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method for associating containers with unit packages distributed therein, the method comprising:
   reading a first code from a container, the container configured for transporting a plurality of unit packages;
   reading a unique second code from each of the plurality of unit packages, each unit package being un-filled at the time the second unique code is read;
   receiving a stack of nested un-filled unit packages and singulating the unit packages from the stack before reading the unique second codes;
   storing an association between the first code and the unique second codes from each of the plurality of unit packages; and
   placing the plurality of un-filled unit packages into the container.

2. The method of claim 1 further comprising nesting together the un-filled unit packages after reading the unique second codes and before placing the un-filled unit packages in the container.

3. The method of claim 1 wherein the container comprises a harvest crate.

4. The method of claim 1 wherein the plurality of unit packages comprises clamshells.

5. The method of claim 1 further comprising labeling each of the plurality of unit packages with a unique second code after singulating the unit packages.

6. The method of claim 5 wherein labeling each of the plurality of unit packages with the unique second code comprises adhering to each of the plurality of unit packages a pre-printed label including the unique second code.

7. The method of claim 1 further comprising assembling the container from cardboard stock before reading the first code from the container.

8. The method of claim 7 further comprising labeling the container with the first code after assembling the container and before reading the unique first code.

9. A method for packaging harvested produce, the method comprising:
   receiving a plurality of nested un-filled clamshells;
   labeling the plurality of un-filled clamshells each with a unique first code;
   labeling a harvest crate with a second code;
   storing an association between the second code and the unique first codes;
   storing an association between the second code and a column code;
   filling each of the plurality of clamshells with harvested produce; and
   packing the plurality of filled clamshells into the harvest crate.

10. The method of claim 9 wherein storing the association between the second code and the unique first codes comprises reading the unique first codes from the plurality of un-filled clamshells and reading the second code from the harvest crate.

11. The method of claim 9 further comprising placing the plurality of un-filled clamshells in the harvest crate after labeling the plurality of un-filled clamshells.

12. The method of claim 9 further comprising fabricating the harvest crate before labeling the harvest crate with the second code.

13. The method of claim 9 further comprising storing an association between the second code and harvest data.

14. The method of claim 9 further comprising storing an association between the second code and a picker identification.

* * * * *